United States Patent [19]

Leutner et al.

[11] 4,395,273

[45] Jul. 26, 1983

[54] PREPARATION OF MULTI-TRACE ELEMENT FERTILIZERS

[75] Inventors: Bernd Leutner, Frankenthal; Berndhard Purucker; Eberhard Rother, both of Ludwigshafen; Geerd F. Juergens; Dieter Wagner, both of Schifferstadt, all of Fed. Rep. of Germany

[73] Assignee: BASF Aktiengesellschaft, Fed. Rep. of Germany

[21] Appl. No.: 322,672

[22] Filed: Nov. 18, 1981

[30] Foreign Application Priority Data

Nov. 28, 1980 [DE] Fed. Rep. of Germany ....... 3044903

[51] Int. Cl.³ .............................................. C05D 5/00
[52] U.S. Cl. ........................................... 71/11; 71/27; 71/DIG. 2; 71/64.06
[58] Field of Search .................. 71/1, 11, 27, DIG. 1, 71/DIG. 2

[56] References Cited

U.S. PATENT DOCUMENTS 3,711,525  1/1973  Hennart ..................................... 71/3
3,898,070  8/1975  Dazzi .............................. 71/DIG. 2

FOREIGN PATENT DOCUMENTS 47-78301  8/1972  Japan ............................. 71/DIG. 2

*Primary Examiner*—Ferris H. Lander
*Attorney, Agent, or Firm*—Keil & Witherspoon

[57] ABSTRACT

A multi-trace element fertilizer which contains magnesium as a further nutrient and in which the complex-forming trace elements are present in the form of anionic chelates with one or more N-carboxyalkylaminoacids is prepared by a process wherein the N-carboxyalkylaminoacids are reacted, in the presence of water, with the trace elements or trace element compounds in a molar ratio of N-carboxyalkylaminoacids to trace elements or trace element compounds of not less than 0.8:1, at least 20% by weight of the trace element compounds being oxides, hydroxides and/or carbonates. At the same time, or subsequently, the pH of the solution is brought to 3.5–6 by adding a member selected from the group consisting of magnesium oxide, hydroxide and carbonate. A maximum of 50 equivalent percent of the magnesium compound may however be replaced by a member selected from the group consisting of alkali metal oxides, hydroxides and carbonates and ammonia.

6 Claims, No Drawings

PREPARATION OF MULTI-TRACE ELEMENT FERTILIZERS

The present invention relates to a process for the preparation of multi-trace element fertilizers having a high content of magnesium and of trace elements, the complex-forming trace elements iron, manganese, copper, zinc, nickel and cobalt being present predominantly in the form of their anionic cheletes with one or more N-carboxyalkylaminoacids.

Normal plant development requires not only the conventional main nutrients but also magnesium and trace elements such as iron, manganese, copper, zinc, nickel, cobalt, boron and molybdenum. The trace elements are needed to build up enzyme systems in the plant cells. If the supply of even one of the said trace elements is stopped or insufficient, deficiency phenomena are observed. Very frequently, such extreme conditions in nutrient supply to plants result from insufficient availability of the trace elements, especially of the said heavy metals, in the soil. For example, chlorosis due to iron deficiency is well known. It can be overcome by supplying the diseased plant with the lacking iron ions, in the form of soluble iron compounds, either via the leaves or via the roots. The iron chelate complexes of N-carboxyalkylaminoacids, for example of ethylenediaminetetraacetic acid, have proved particularly effective for this purpose. The chelate complexes of other trace elements also have proved more effective than the straight inorganic salts (cf. S. Chabarek and A. Martell, Organic Sequestering Agents, John Wiley and Sons, Inc. 1959, pages 455–469; German Pat. No. 945,847).

For these reasons, metal chelates of this type are employed to alleviate crop damage caused by trace element deficiencies or, prophylactically, to prevent such deficiency diseases and accordingly to increase agricultural yields (cf. A. Wallace, Farm Chemicals 133, 34 (1970); A. Finck, Dünger und Düngung, Verlag Chemie, Weinheim 1979, pages 93–137).

Such trace element fertilizers are marketed in solid, pasty and even predissolved form. Solid trace element fertilizers employed are in the main fertilizers compounded from the individual components; in almost all cases, these are the sodium salts of the anionic trace element chelates, often mixed with neutral salts, for example sodium sulfate. The use of potassium salts and ammonium salts of the anionic chelates of the trace elements has also been described.

Mixtures which in addition to a plurality of trace elements contain magnesium as a further nutrient have recently been employed to an increasing degree, especially as leaf fertilizers, for improved feeding of crops on land of high yield potential.

Such solid multi-trace element fertilizers also containing magnesium are manufactured either by mixing the above (separately prepared) chelates of the individual components, with addition of water-soluble magnesium salts, for example magnesium sulfate, and of other, non-chelated or non-chelatable, trace elements, such as boron and molybdenum, or by simply mixing water-soluble magnesium salts and water-soluble salts of the trace elements with the sodium salts or potassium salts of the complex-forming N-carboxyalkylaminoacids (German Pat. No. 2,313,921 and German Published Application DAS No. 2,846,832).

The solid mixtures obtained principally suffer from the following disadvantages:

In mixtures of salts of different particle sizes and different densities, there is always a danger of demixing.

On prolonged storage, for example at elevated temperatures, and on storage contrary to the manufacturer's instructions, caking may occur, the cause of which is principally the moisture-accelerated solid reaction between the complexing agents and the technical-grade trace element salts generally employed in a hydrated form, this reaction resulting in complexing, liberation of water of crystallization, and subsequent recrystallization of trace element chelate hydrates.

Furthermore, the sparingly soluble impurities contained, at least in small amounts, in the technical-grade salts usually employed can lead to difficulties in use, especially for leaf spraying, for example as a result of clogging of the atomizers.

In all the cases mentioned, including, for example, the manufacture of pasty products, magnesium, in the form of water-soluble salts, is employed in addition to water-soluble trace element salts. The resulting relatively high content of anions imposes a severe restriction on the maximum total trace element content of the mixtures.

Hitherto, commercial solid multi-trace element fertilizers containing magnesium have therefore contained 4–6 percent by weight of the complex-forming trace elements Fe, Mn, Cu and Zn, with or without Co, or 8–12 percent by weight of all trace elements including Mg, calculated as MgO, and the non-complexable trace elements boron and molybdenum.

It is an object of the present invention to provide a simple process for the preparation of multi-trace element fertilizers containing magnesium and chelates of the complex-forming trace elements of the group comprising Me=Fe, Mn, Zn, Cu, Co and Ni, which gives a multitrace element fertilizer which has a substantially higher nutrient content than the conventional fertilizers of this type and moreover fully conforms to requirements in respect of activity and plant toleration, which exhibits good shelf life, which dissolves rapidly in water, leaving virtually no residue, and which does not exhibit demixing.

We have found that this object is achieved, according to the invention, by a process wherein the N-carboxyalkylaminoacids are reacted, in the presence of water, with the trace elements or trace element compounds in a molar ratio of N-carboxyalkylaminoacids to trace elements or trace element compounds of not less than 0.8:1, at least 20% by weight of the trace element compounds being oxides, hydroxides and/or carbonates, and at the same time, or subsequently, the pH of the solution is brought to 3.5–6 by adding a magnesium compound selected from the group consisting of magnesium oxide, hydroxide and carbonte. The magnesium compound necessary for raising the pH may be replaced by an alkali metal oxide, hydroxide and/or carbonate with the proviso that not less than 50 equivalent percent of the total alkaline compounds required are magnesium compounds.

In the reaction according to the invention, the N-carboxyalkylaminoacids are reacted with the trace element compounds in the presence of water. The amount of water must be so chosen than an easily stirred suspension is obtained, in order to ensure rapid and effective reaction. Advantageously, sufficient water should be present that, after completion of the reaction, the products are present in solution. Not less than 20% by weight of the total requirement amount of the trace element compounds is employed in the form of the carbonates (which is generally are sparingly water-soluble) or, in particular, the oxides and hydroxides, and the reaction is carried out with a molar ratio of N-carboxyalkylaminoacids to trace element of not less than 0.8:1, ie. after completion of the reaction not less than about 80% of the trace elements employed are present as complexes. In general, however, a molar ratio of 1:1 should not be exceeded.

The remainder of the trace element compounds may consist of nitrates, chlorides or, in particular, sulfates of the particular elements. It is also possible to employ the elements themselves, instead of the compounds, provided the elements are less noble than hydrogen.

The N-carboxyalkylaminoacids may be unsubstituted or substituted. Preferred acids are nitrilotriacetic acid ($H_3NTA$), hydroxyethylethylenediaminetriacetic acid ($H_3EDTA$) and cyclohexane-1,2-diaminotetraacetic acid ($H_4CDTA$), but especially diethylenetriaminepentaacetic acid ($H_5DPTA$) and, most preferred of all, ethylenediaminetetraacetic acid ($H_4EDTA$).

According to a further feature of the invention, the pH of the reaction solution is raised to 3.5–6 by adding to the reaction solution or suspension, simultaneously with or after completion of the reaction of the acids with the trace element compounds, magnesium oxide, hydroxide or carbonate and/or an alkali metal oxide, hydroxide and/or carbonate, especially of sodium and/or potassium and/or ammonia. However, not less than 50 equivalent percent of the alkali required must be employed in the form of the magnesium compounds mentioned. What precise pH is required after completion of the reaction in solution or suspension depends on the desired nutrient composition of the magnesium-containing multitrace element fertilizer being prepared. It is not necessary to wait for completion of the reaction before adjusting the pH; instead, the pH adjustment can also be made during the reaction itself. Of course it is also possible to employ the N-carboxyalkylaminoacids not as such butm at least partially, in the form of their corresponding alkali metal salts, ammonia salts or magnesium salts, so that neutralization has in part been carried out beforehand. This approach can under certain circumstances be advantageous because of the different solubility characteristics, the salts of the N-carboxyalkylaminoacids being more soluble in water than the corresponding acids themselves are. The reaction is advantageously carried out at an elevated temperature, for example by refluxing the mixture for from 1 to 5 hours. After completion of the reaction, a solution or suspension—depending on the amount of water employed—of the reactants is obtained, which can be used as a liquid multi-trace element fertilizer. Of course, these suspensions or solutions can also contain other conponents which serve as fertilizers, such as nitrogen (for example as urea), boron and molybdenum, as well as crop protection agents, fungicides, colorants, wetting agents and the like.

If desired, the solution or suspension obtained can also be solidified by abstracting water. This can advantageously be effected by spray drying or—particularly in order to produce free-flowing, non-dusting products—drying by spraying into a fluidized bed. To achieve a solid product which is particularly rapidly and easily soluble, the abstraction of water should be stopped when the residual water content is 4–10% by weight (determined by the Aufhäuser method).

In the Examples which follow, the percentages are by weight.

EXAMPLE 1

(A) 14.72 kg of water, 160 g of magnesium oxide (containing 97% of MgO), 828 g of goethite (FeO(OH) containing 58% of Fe), 340 g of manganese dioxide (96% of $MnO_2$) and 5,703 g of ethylenediaminetetraactic (hereafter referred to as $H_4EDTA$) are introduced into a reaction vessel equipped with a stirrer and reflux condenser, and the mixture is refluxed for 3 hours.

Thereafter, a further 252.4 g of magnesium oxide (97% of MgO), 119.6 g of basic copper carbonate ($CuCO_3.Cu(OH)_2$ containing 57.5% of Cu), 503 g of zinc oxide (ZnO), 7.4 g of ammonium molybdate (($NH_4)_6Mo_7O_{24}.4H_2O$), 6.3 g of cobalt hydroxide (Co-(OH)$_2$, containing 63.4% of (Co) and 389.6 g of boric acid ($H_3BO_3$) are introduced.

The batch is refluxed for a further hour. The pH of the hot solution is brought from 3.5 to 5.3 by means of 573 g of concentrated aqueous ammonia (25% of $NH_3$). The solution (23.6 kg) is filtered hot and is spray-dried to give 8.2 kg of a brown solid containing the following: 4.9% of MgO; 5.9% of Fe; 2.4% of Mn; 4.9% of Zn; 0.8% of Cu; 0.05% of Mo; 0.8% of B; 0.05% of Co; 8.0% of $H_2O$; 69.9% of $H_4EDTA$.

(B) To prepare a solution with good shelf life, the solution (23.6 kg) obtained as an intermediate in A is diluted, by addition of 3.1 kg of water, to a solids content of 30.7% (based on solids).

This gives a liquid multi-trace element fertilizer containing the following: 1.5% of MgO; 1.8% of Fe; 0.7% of Mn; 1.5% of Zn; 0.25% of Cu; 0.015% of Mo; 0.25% of B; 0.015% of Co.

EXAMPLE 2

52.18 kg of $H_4EDTA$ and 14.0 kg of 87 percent strength tetrasodium ethylenediaminetetraacetate ($Na_4EDTA$) are suspended in 152 kg of water in a steam-heated 300 liter stirred kettle and the following materials are added: 10.0 kg of magnesium hydroxide ($Mg(OH)_2$), 25.4 kg of iron sulfate ($FeSO_4.7H_2O$), 3.74 kg of 93 percent pure manganese dioxide ($MnO_2$), 2.75 kg of copper sulfate ($CuSO_4.5H_2O$), 5.48 kg of zinc oxide (ZnO), 4.0 kg of boric acid ($H_3BO_3$), 0.08 kg of ammonium molybdate (($NH_4)_6Mo_7O_{24}.4H_2O$) and 0.20 kg of cobalt sulfate ($CoSO_4.7H_2O$).

The suspension is heated to the boil and is refluxed for one hour. 14.3 kg of 25 percent strength ammonia solution are added to bring the pH to 4.8, and the batch is filtered hot. The solution obtained is dried by spraying into a fluidized bed, giving 100 kg of an olive-green gritty solid containing the following: 4.4% of MgO; 5.1% of Fe; 2.2% of Mn; 0.7% of Cu; 4.4% of Zn; 0.7% of B; 0.04% of Mo; 0.04% of Co; 9.2% of $H_2O$; 2.9% of $NH_4$ nitrogen.

EXAMPLE 3

5.34 kg of water are introduced into a reaction vessel equipped with a stirrer and reflux condenser, and the following materials are added successively or as a mixture: 1,463 g of $H_4EDTA$, 1,194 g of 87 percent strength $Na_4EDTA$, 236 g of 97 percent pure magnesium oxide (MgO), 195 g of 93 percent pure manganese dioxide ($MnO_2$), 28.4 g of zinc oxide (ZnO), 914 g of iron sulfate ($FeSO_4.7H_2O$), 131 g of boric acid ($H_3BO_3$), 42 g of ammonium molybdate (($NH_4)_6Mo_7O_{24}.4H_2O$) and 10.8 kg of cobalt sulfate ($CoSO_4.7H_2O$).

The batch is heated to the boil and refluxed for 1 hour. The green solution obtained (pH=5) is filtered hot and dried by fluidized bed spraying, to give 4,200 g of a green gritty product containing the following: 5.5% of MgO; 4.4% of Fe; 2.7% of Mn; 2.7% of Cu; 0.54% of Zn; 0.54% of Mo; 0.54% of B; 0.05% of Co; 8.0% of $H_2O$.

To determine the solubility, different amounts of the product are dissolved in water at 25° C. whilst stirring by means of a Hoesch grid stirrer at 350 rpm, and after 3 minutes' stirring, the undissolved residue is measured.

| Weight used | 2 g/l | 10 g/l | 80 g/l | 160 g/l | 350 g/l |
|---|---|---|---|---|---|
| undissolved residue in % of weight used | 0.005 | 0.01 | 0.03 | 0.03 | 0.03 |

The Table shows that the product dissolves virtually completely in water.

EXAMPLE 4

The following starting materials are suspended in 144 kg of water, after which the mixture is heated to the boil: 57.0 kg of $H_4EDTA$, 9.82 kg of 97 percent pure magnesium oxide (MgO), 6.49 kg of 93 percent pure manganese dioxide ($MnO_2$), 2.38 kg of zinc oxide (ZnO), 18.97 kg of iron sulfate ($FeSO_4.7H_2O$), 7.47 kg of copper sulfate ($CuSO_4.5H_2O$), 3.26 kg of boric acid ($H_3BO_3$), 175 g of ammonium molybdate (($NH_4)_6Mo_7O_{24}.4H_2O$) and 272 g of cobalt sulfate ($CoSO_4.7H_2O$).

After the solution has been refluxed for one hour, it is filtered hot (at 80° C.); the pH of the solution is 4.5. The filtrate is spray-dried to give 100 kg of a green powder. The latter is mixed homogeneously with 5.26 kg of sodium bicarbonate powder. The mixture obtained contains the following: 9% of MgO; 3.5% of Fe; 3.6% of Mn; 1.8% of Cu; 1.8% of Zn; 0.54% of B; 0.09% of Mo; 0.05% of Co.

EXAMPLE 5

(A) 370.8 g of $H_4EDTA$ and 268.4 g of diethylenetriaminepentaacetic acid ($H_5DTPA$) are suspended in 1,720 g of water, and the following starting materials are added: 98.3 g of 97 percent pure magnesium oxide, 64.9 g of 93 percent pure manganese dioxide, 23.8 g of zinc oxide, 189.7 g of iron sulfate ($FeSO_4.7H_2O$), 74.7 g of copper sulfate ($CuSO_4.5H_2O$), 32.8 g of boric acid ($H_3BO_3$), 1.75 g of ammonium molybdate (($NH_4)_6Mo_7O_{24}.4H_2O$) and 2.72 g of cobalt sulfate ($CoSO_4.7H_2O$).

The batch is heated to the boil and refluxed for half an hour. The clear green solution obtained (pH 3.5) is filtered hot and evaporated to dryness. After further drying at 60° C. under reduced pressure from a water pump, 1,130 g of a green solid are obtained. This contains 8.4% of MgO; 3.4% of Fe; 3.4% of Mn; 2.7% of Cu; 1.7% of Zn; 0.5% of B; 0.08% of Mo and 0.05% of Co.

(B) To prepare a 30 percent strength solution with good shelf life, 919 g of water are added to the green solution (39.7% solids content) obtained as an intermediate in Example A. The diluted solution contains 2.5% of MgO; 1.0% of Fe; 1.0% of Mn; 0.5% of Cu; 0.5% of Zn; 0.15% of B; 0.024% of Mo and 0.015% of Co.

EXAMPLE 6

(A) 430.7 g of cyclohexane-trans-1,2-diaminetetraacetic acid monohydrate ($H_4CDTA.H_2O$), 70.7 g of $H_4EDTA$ and 130.7 g of 87 percent pure $Na_4EDTA$ are suspended in 1,560 g of water and the following materials are added; 91.0 g of 97 percent pure magnesium oxide, 18.7 g of 93 percent pure manganese dioxide, 13.7 g of zinc oxide, 330 g of iron sulfate ($FeSO_4.7H_2O$), 43.2 g of copper sulfate ($CuSO_4.5H_2O$), 62.9 g of boric acid and 0.18 g of ammonium molybdate (($NH_4)_6Mo_7O_{24}.4H_2O$).

The batch is heated to the boil and refluxed for 30 minutes. The clear solution obtained (2,750 g; pH=4.6) is filtered hot and evaporated to dryness. After further drying, at 60° C. under reduced pressure from a water pump, 1,100 g of a green solid are obtained. This contains 8.0% of MgO; 6.0% of Fe; 1.0% of Mn; 1.0% of Cu; 1.0% of Zn; 1.0% of B and 0.01% of Mo.

(B) The solution (2,750 g, 40% solids) obtained in Example 6 A also has a good shelf life at room temperature. It contains 3.2% of MgO; 2.4% of Fe; 0.4% of Mn; 0.4% of Cu; 0.4% of Zn; 0.4% of B and 0.004% of Mo.

EXAMPLE 7

124 kg of water, 41.62 kg of $H_4EDTA$ and 28.43 kg of 40 percent strength $Na_4EDTA$ solution are suspended in a steam-heated 300 liter stirred kettle and the following materials are added: 9.07 kg of 97 percent pure magnesium oxide, 33 kg of iron sulfate ($FeSO_4.7H_2O$), 1.87 kg of 93 percent pure manganese dioxide, 137 kg of zinc oxide, 6.29 kg of boric acid and 18.4 g of ammonium molybdate ($(NH_4)_6Mo_7O_{24}.4H_2O$).

The suspension is heated to the boil and refluxed for 1 hour at 102° C. After addition of 4.32 kg of copper sulfate ($CuSO_4.5H_2O$), the solution formed, which has a pH of 4.3, is filtered hot (at 80° C.) and spray-dried in a fluidized bed to give 100 kg of a green gritty product. This contains: 8.8% of MgO; 6.6% of Fe; 1.1% of Mn; 1.1% of Cu; 1.1% of Zn; 1.1% of B; 0.01% of Mo and 8.4% of $H_2O$.

EXAMPLE 8

292.2 g of $H_4EDTA$ are suspended in 610 g of water. 27.2 g of 95 percent pure manganese dioxide ($MnO_2$) and 21.6 g of 98 percent pure iron powder are introduced, with stirring. The batch is heated to the boil and refluxed for 1 hour. The pale yellow suspension obtained (pH 2.2 at 90° C.) is mixed with 26.7 g of zinc oxide and 23.1 g of 92 percent pure magnesium oxide, and refluxed for a further hour. The brownish yellow solution is filtered hot (pH 3.6 at 36° C.) and evaporated to dryness. After further drying, at 60° C. under reduced pressure from a water pump, 415 g of a brownish yellow solid are obtained, containing the following: 5.1% of MgO; 5.1% of Fe; 3.9% of Mn; 5.1% of Zn.

We claim:

1. A process for the preparation of a multi-trace nutrient fertilizer which contains magnesium as a further nitrient and in which the complexforming trace elements are present in the form of anionic chelates with one or more N-carboxyalkylaminoacids, which comprises: reacting the N-carboxyalkylaminoacids, in the presence of water, with the trace elements or trace element compounds in a molar ratio of N-carboxyalkylaminoacids to trace elements or trace element compounds of not less than 0.8:1, at least 20% by weight of the trace element compounds being oxides, hydroxides and/or carbonates to form an anionic trace element chelate, and at the same time, or subsequently, raising the pH of the solution to 3.5–6 by adding a magnesium compound selected from the group consisting of magnesium oxide, hydroxide and carbonate, whereby said magnesium compound reacts with said anionic trace element chelate.

2. The process of claim 1, wherein the solution obtained after the reaction is solidified by abstracting water.

3. The process of claim 2, wherein the water is abstracted by spray-drying or fluidized bed spray drying.

4. The process of claim 2, wherein the abstraction of water is taken to a residual content of 4–10% by weight.

5. The process of claim 1, wherein a maximum of 50 equivalent percent of the magnesium compound required is replaced by a member selected from the group consisting of alkali metal oxides, hydroxides and carbonates and ammonia.

6. The process of claim 1, wherein the amount of water that is present in the process, is sufficient to form a solution of the reaction products.

* * * * *

UNITED STATES PATENT AND TRADEMARK OFFICE
CERTIFICATE OF CORRECTION

PATENT NO. : 4,395,273

DATED : July 26, 1983

INVENTOR(S) : Bernd Leutner et al.

It is certified that error appears in the above-identified patent and that said Letters Patent is hereby corrected as shown below:

Claim 1, column 6, line 57, change "nitrient" to --nutrient--.

Signed and Sealed this

Twelfth Day of June 1984

[SEAL]

Attest:

GERALD J. MOSSINGHOFF

Attesting Officer

Commissioner of Patents and Trademarks